United States Patent [19]

Rymal, Jr.

[11] Patent Number: 4,492,630
[45] Date of Patent: Jan. 8, 1985

[54] BILGE SYSTEM
[75] Inventor: Theodore R. Rymal, Jr., Conroe, Tex.
[73] Assignee: Texas Oil Spill Control, Inc., Conroe, Tex.
[21] Appl. No.: 406,443
[22] Filed: Aug. 9, 1982

Related U.S. Application Data

[63] Continuation-in-part of Ser. No. 308,932, Aug. 5, 1981, abandoned.
[51] Int. Cl.³ .............................................. B01D 17/02
[52] U.S. Cl. ................................... 210/117; 210/258; 210/521; 137/172
[58] Field of Search .............. 210/521, 522, 523, 515, 210/257, 923, 242.1, 242.3, 800, 220, 536, 259, 260, 117, 136, 258; 137/172; 55/445, 189, 193

[56] References Cited

U.S. PATENT DOCUMENTS

| Re. 30,729 | 9/1981 | Farrell et al. | 210/801 |
|---|---|---|---|
| 1,048,717 | 12/1912 | Maywald | 210/260 |
| 1,240,081 | 9/1917 | Moss | 210/536 |
| 2,948,677 | 8/1960 | Austin et al. | 210/608 |
| 3,237,774 | 3/1966 | Schuback | 210/242.3 |
| 3,376,977 | 4/1968 | Gordon et al. | 210/117 |
| 3,495,561 | 2/1970 | Trapp | 210/242.3 |
| 3,656,624 | 4/1972 | Walton | 210/242.3 |
| 3,661,263 | 5/1972 | Peterson et al. | 210/242.3 |
| 3,662,891 | 5/1972 | Headrick | 210/242.3 |
| 3,662,892 | 5/1972 | Sorensen | 210/242.3 |
| 3,663,149 | 5/1972 | Heagler | 431/2 |
| 3,664,505 | 5/1972 | Brittingham | 210/242.3 |
| 3,666,099 | 5/1972 | Galicia | 210/242.3 |
| 3,690,464 | 9/1972 | Heinicke | 210/242.3 |
| 3,700,107 | 10/1972 | Flaviani | 210/242.3 |
| 3,708,070 | 1/1973 | Bell | 210/242.3 |
| 3,722,688 | 3/1973 | Wirsching | 210/242.3 |
| 3,726,406 | 4/1973 | Damberger | 210/242.3 |
| 3,731,813 | 5/1973 | Tipton | 210/242.3 |
| 3,737,040 | 6/1973 | Bryday et al. | 210/206 |
| 3,748,264 | 7/1973 | McCombie | 210/242.3 |
| 3,762,556 | 10/1973 | Penton | 210/242.3 |
| 3,762,558 | 10/1973 | Anderson | 210/242.3 |
| 3,771,662 | 11/1973 | Muramatsu et al. | 210/242.3 |
| 3,810,547 | 5/1974 | Shudo | 210/242.3 |
| 3,823,828 | 7/1974 | Derzhavets et al. | 210/242.3 |
| 3,833,122 | 9/1974 | Cook | 210/207 |
| 3,844,944 | 10/1974 | Mercuri | 210/800 |
| 3,850,807 | 11/1974 | Jones | 210/170 |
| 3,907,685 | 9/1975 | Aramaki et al. | 210/242.3 |
| 3,923,649 | 12/1975 | Sparham et al. | 210/242.3 |
| 3,966,613 | 6/1976 | Kirk et al. | 210/242.3 |
| 3,988,241 | 10/1976 | Rafael | 210/208 |
| 4,010,103 | 3/1977 | Morgan et al. | 210/242.1 |
| 4,042,512 | 8/1977 | McCarthy et al. | 210/519 |
| 4,045,344 | 9/1977 | Yokota | 210/521 |
| 4,046,693 | 9/1977 | Glover | 210/256 |
| 4,056,472 | 11/1977 | Teasdale | 210/242.3 |
| 4,089,284 | 5/1978 | Matsuno et al. | 210/242.1 |
| 4,104,164 | 8/1978 | Chelton | 210/136 |
| 4,119,541 | 10/1978 | Makaya | 210/242.3 |
| 4,123,357 | 10/1978 | Clements et al. | 210/800 |
| 4,145,280 | 3/1979 | Middelbeek et al. | 210/259 |
| 4,151,081 | 4/1979 | Bolli et al. | 210/242.3 |
| 4,257,889 | 3/1981 | Wöber et al. | 210/104 |
| 4,305,819 | 12/1981 | Kobozev et al. | 210/242.1 |
| 4,356,086 | 10/1982 | Öberg | 210/242.3 |
| 4,436,630 | 3/1984 | Anderson | 210/119 |

FOREIGN PATENT DOCUMENTS

| 1072455 | 2/1980 | Canada . |
| 2201143 | 8/1972 | Fed. Rep. of Germany . |
| 2354939 | 10/1974 | Fed. Rep. of Germany . |
| 55-22574 | 2/1980 | Japan . |
| 783115 | 11/1980 | U.S.S.R. |

Primary Examiner—Peter Hruskoci
Attorney, Agent, or Firm—David M. Ostfeld

[57] ABSTRACT

A portable system is disclosed for collecting hydrocarbons, or other floating materials, from a body of water, such as a bilge. A pump, such as a vacuum pump, collects the water and hydrocarbons and conveys same to an oil/water separator. The oil/water separator receives the water and hydrocarbons and separates the mixture. The oil/water separator has a housing with two tanks connected by a passageway. For separation, the oil/water mixture is fed into one of the tanks of the housing of the oil/water separator. The water then passes through the passageway having a plurality of baffles and, optionally, other separating mechanisms mounted therein and into the second tank. An oil outlet allows the removal of separated oil from the top portion of the second tank while a water outlet allows the removal of water from the bottom portion of the second tank. Optionally, a pair of check valves may also be mounted between the first tank and the passageway.

4 Claims, 1 Drawing Figure

BILGE SYSTEM

This is a continuation in part of Ser. No. 308,932, filed Aug. 5, 1981, now abandoned.

DESCRIPTION OF THE PRIOR ART

In the past, a wide variety of devices have been provided for separating oil and water. However, none of the art appears to disclose a portable separator capable of separating oil and water from enclosed areas.

Most oil/water separators allow the oil/water mixture to settle in a tank so that the oil will float to the top of the water where it is removed with a pump while the water is removed from the bottom of the tank. One prior oil/water separator adapted for land use can be seen in U.S. Pat. No. 4,042,512 to McCarthy, et al., where the oil/water mixture is directed against an angled corrugated surface and then through corrugated baffle members and uses a last-in last-out separator for the oil/water mixture.

SUMMARY OF THE INVENTION

An oil/water separator is provided in conjuncton with a pump, such as, for example, a vacuum pump. The separator includes a housing forming a pair of tanks connected by a passageway. The oil/water mixture inlet directs the liquid into one tank which is connected between its ends to the passageway. The connection may include, for example, a pair of check valves to allow the flow of liquid into the passageway, but not from the passageway back into the first tank. The passageway has a plurality of predetermined baffles mounted therein for separating oil and water and connects to the middle of the second tank which has an oil outlet connected to the top portion of the tank and an overflow water outlet connected to the bottom portion of the tank. The inlet of the oil/water separator is connected to the pump which has a hose, or other suitable apparatus, to connect it to the oil/water mixture. Because of the configuration of the apparatus, it can be structured in miniature to permit portability.

BRIEF DESCRIPTION OF THE DRAWINGS

For a detailed description of the preferred embodiment of the invention, reference should be made to the following detailed description, taken in conjunction with the accompanying drawings, in which like parts are given like reference numerals, and wherein.

DESCRIPTION OF THE PREFERRED EMBODIMENT

Figure 1:
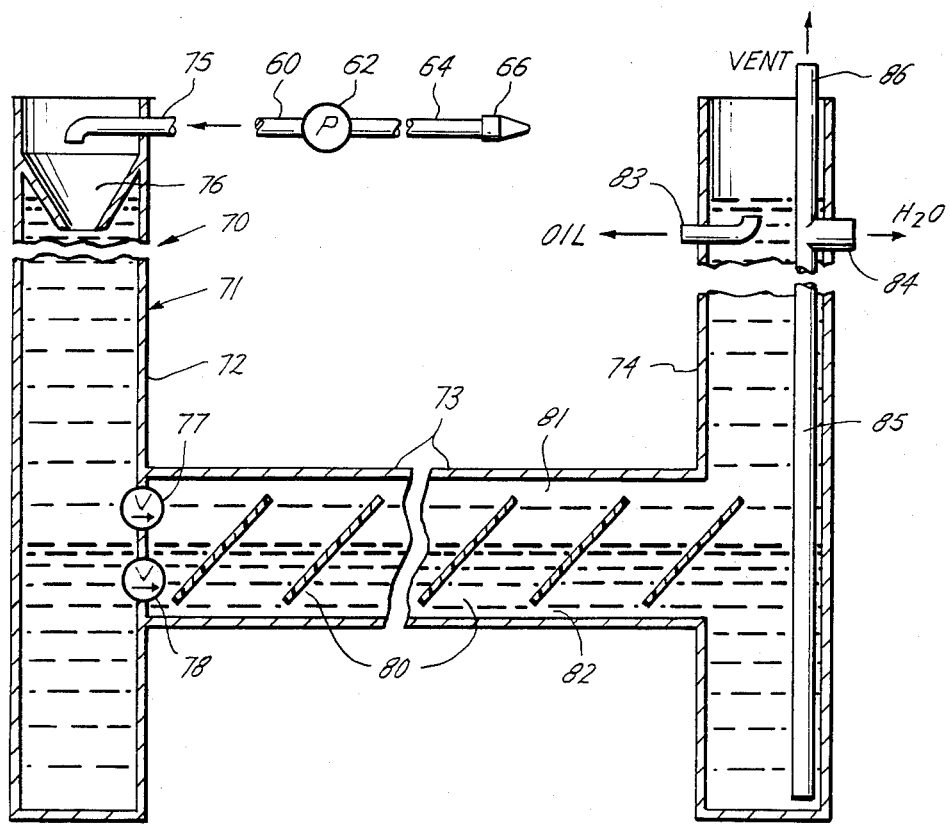
FIG. 1 is a cross-section of the oil/water separator of the preferred embodiment of the present invention.

Referring to FIG. 1, an oil/water separator 70 has a housing 71 forming a first tank 72 and a passageway 73 connecting the tank 72 to a second tank 74. An oil/water inlet line 75 feeds mixture into a funnel portion 76 at the top of tank 72. Inlet line 75 is connected by line 60 to the outlet of pump 62, such as a vacuum pump. The inlet of pump 62 is connected to hose 64, having nozzle 66 suitable for insertion into a bilge or the like.

As the oil/water mixture pours into the tank 72, it begins to separate with the oil floating to the top. Between the ends of the tank 72, a passageway 73 is connected thereby to an upper check valve 77 and a lower check valve 78 which is used to maintain the already partially separated oil and water as it proceeds through the passageway 73 and to prevent it from flowing back into the tank 72. A plurality of angled baffles 80 are mounted in the passageway 73 angled for the rising oil to float over the top area 81 of the baffles 80 while the water can pass under the baffles 80 through the passage 82. The baffles 80 need to be made of materials having oil adhesive characteristics, such as acrylic polymers. Other separating mechanisms (not shown) may also be incorporated in passage 82. The water and oil thus proceed through a series of baffles, as shown, into the tank 74 where the oil tends to be substantially separated and rises to the upper portion of the tank 74 while the water tends to stay in the bottom of the tank 74. Along the upper part of the tank 74 is an oil outlet 83 and a water outlet 84. The water outlet is connected to an elongated water pipe 85 extending down near the bottom of the tank 74 so that when the tank fills up sufficiently for the oil to leave the outlet 83, the water will also flow out or overflow from the pipe 84. Thus, a pump is not required to remove the oil and water even though a pump is used to raise the mixture to the inlet 75. A vent pipe 86 is connected to the pipe 85 and acts as a siphon break to prevent a siphon from being generated and thereby emptying the tank 74.

The diameter of tank 72 and tank 74 are substantially equal and vary from four inches to thirty-six inches. Passageway 73 has a area between one and two times as great as tanks 72, 74. Baffles 80 are elliptical or rectangular and have a area between one hundred and two hundred percent of the area of passageway 73.

Although the system described in detail supra is most satisfactory and preferred, many variations in structure and method are possible. For example, the tanks may not be substantially identical in size and the diameter of the passageway is sized with regard to tank 72. The above is an example of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. An oil/water separator comprising in combination:
   a housing forming a pair of tanks connected by a passageway arranged between the top and bottom of said tanks;
   an oil/water mixture inlet in one tank of said housing;
   check valve means between said one tank and said passageway between said tanks to prevent said oil/water mixture from flowing back to said one tank from said passageway;
   a plurality of baffles mounted at an angle with a space above and below each said baffle in said passageway between said tanks to permit fluid to flow about both the upper and lower ends of said baffles and therebetween;
   an oil outlet from said other tank;
   a water outlet from said other tank; and
   the area of said passageway is one to two times as great as the area of said one tank, whereby an oil/water mixture fed into said one tank begins separating in said one tank and through a series of baffles dividing the oil from the water in said passageway for separate removal from said other tank.

2. An oil/water separator comprising in combination:

a housing forming a pair of tanks connected by a passageway arranged between the top and bottom of said tanks;
an oil/water mixture inlet in one tank of said housing;
check valve means between said one tank and said passageway between said tanks to prevent said oil/water mixture from flowing back to said one tank from said passageway;
a plurality of baffles mounted at an angle with space above and below each said baffle in said passageway between said tanks to permit fluid to flow about both the upper and lower ends of said baffles and therebetween an oil outlet from said other tank;
a water outlet from said other tank; and
the area of said passageway is one to two times as great as the area of said one tank; whereby an oil/water mixture fed into said one tank begins separating in said one tank and through a series of baffles dividing the oil from the water in said passageway for separate removal from said other tank,
wherein said baffles are elliptical in shape and the area of said elliptical baffles in one hundred to two hundred percent of the area of said passageway.

3. A bilge pump system, comprising:
a pump;
a hose connected to the inlet of said pump;
an oil/water separator;
connection means for connecting the outlet of said pump to said oil/water separator; and
said oil/water separator including a housing forming a pair of tanks connected by a passageway arranged between the top and bottom of said tanks; an oil/water mixture inlet in one tank of said housing; check valve means between said one tank and said passageway between said tanks to prevent said oil/water mixture from flowing back to said one tank from said passageway; a plurality of baffles mounted at an angle with a space above and below each said baffle in said passageway between said tanks to permit fluid to flow about both the upper and lower ends of said baffles and therebetween; an oil outlet from said other tank; a water outlet from said other tank; and the area of said passageway is one to two times as great as the area of said one tank, whereby an oil/water mixture fed into said one tank begins separating in said one tank and through a series of baffles dividing the oil from the water in said passageway for separate removal from said other tank.

4. The bilge pump system of claim 3 wherein said baffles are elliptical in shape and the area of said elliptical baffles is one hundred to two hundred percent of the area of said passageway.

* * * * *